UNITED STATES PATENT OFFICE.

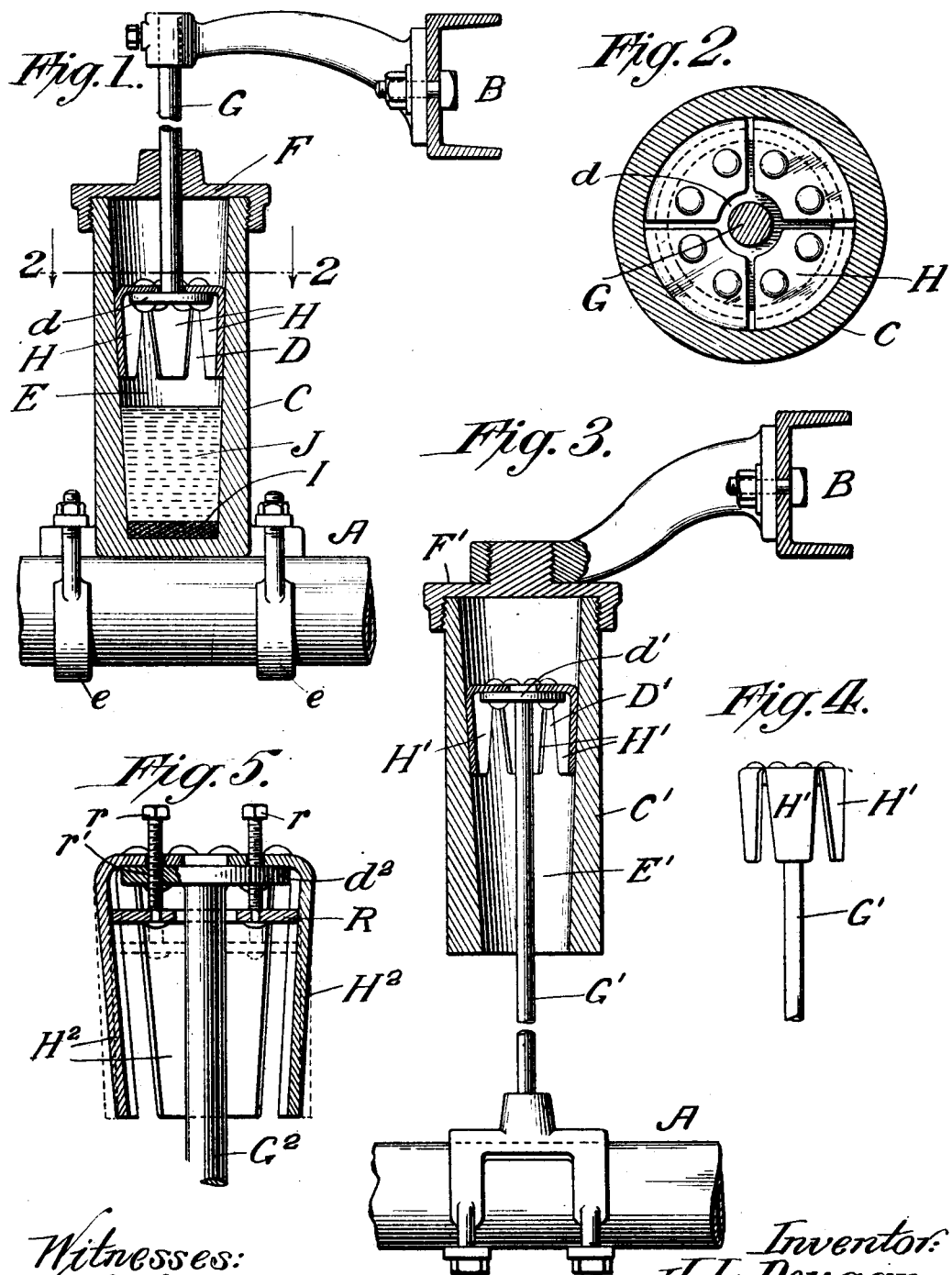

JOHN L. DOUGAN, OF PLANKINTON, SOUTH DAKOTA.

VEHICLE-SPRING.

1,129,560. Specification of Letters Patent. Patented Feb. 23, 1915.

Application filed September 4, 1914. Serial No. 860,211.

*To all whom it may concern:*

Be it known that I, JOHN L. DOUGAN, a citizen of the United States, residing in Plankinton, in the county of Aurora and State of South Dakota, have invented certain new and useful Improvements in Vehicle-Springs, of which the following is a specification.

This invention relates to springs for use on vehicles of various kinds either in place of the conventional or ordinary springs or in connection therewith or supplemental thereto to absorb shock incident to the rebound or recoil of the springs after their sudden compression.

In carrying out my invention I provide a casing member and a plunger member. The casing incloses a chamber having tapered walls and the plunger comprises a head carrying a series of springs which bear against the tapered walls of the chamber. One member of the device is connected with the axle of the vehicle or with some other part of the running gear and the other member of the device is connected with the vehicle body, the arrangement being such that by comparatively few parts the force of spring tension and friction are so combined as to most efficiently absorb shocks and vibrations, while at the same time giving a wide range of action and great flexibility.

My improvements are illustrated in the accompanying drawings in which,

Figure 1 is a vertical section showing my invention embodied in a vehicle spring designed to take the place of the ordinary leaf spring commonly employed in vehicles. Fig. 2 is a view on an enlarged scale and in section on the line 2—2 of Fig. 1. Fig. 3 is a view similar to Fig. 1 but showing the device arranged to operate as a shock absorber. Fig. 4 is a detail view in side elevation of the plunger. Fig. 5 is a detail view on an enlarged scale and in section showing a modified form of plunger provided with devices for adjusting the spring tension.

Referring to Figs. 1 and 2 a vehicle axle is indicated at A and a portion of the vehicle body at B. C indicates the casing member of the device and D the plunger. The casing incloses a chamber E which is tapered from its upper end downward, *i. e.*, it is wider at the top. It is attached to the axle A by suitable devices e and it is provided with a removable cover F. The head d of the plunger is attached to the lower or inner end of the plunger rod G which is connected with the vehicle body B. The diameter of the head d is less than that of the chamber at any part thereof and said head carries a series of springs H, the upper horizontal portions of which are firmly secured to the head in the manner indicated in Figs. 1 and 2. The depending vertical portions of the springs bear against the walls of the chamber E with considerable pressure. A cushion or buffer I is preferably seated at the bottom of the chamber and oil J is contained in said chamber for lubricating purposes. When the vehicle body is depressed, the plunger is forced downward against the sidewise tension of the springs and friction and wedging force produced by the movement of the springs against the tapered walls of the chamber, and when the vehicle body rises, the plunger moves upward in the chamber gradually and the friction and wedging action, as well as the spring tension, are gradually relieved.

In Fig. 3 I have shown my improvements embodied in a shock absorber. In this case the axle and vehicle body are designated by the letters A and B respectively, as before, and the casing is indicated by the letter C′. The casing chamber is lettered E′ and this chamber, as before, tapers from its upper end downward. At the top the chamber has a removable cover F′ which is attached to the vehicle body. The casing is open at its lower end and the rod G′ is attached to the axle A in the manner shown. It will be observed that the essential difference between the two constructions is that when the device is employed as a supporting spring for the vehicle, the plunger is attached to the vehicle body and the casing to the axle, whereas, when the device is used as a shock absorber the plunger is attached to the axle and the casing to the vehicle body.

Of course, it is understood that the device need not be attached directly to the axle, but may be applied to any other part of the running gear. When operating as a shock absorber the upward movement of the body is resisted yieldingly by the plunger D′, the springs H′ of which operate in the manner before described but in a reverse way. When the vehicle body rises the spring tension or pressure is gradually but firmly applied and the friction and wedging action gradually increases.

The tension of the springs may be made adjustable in the manner indicated in Fig. 5. In this case the rod $G^a$ carries a head $d^a$ and springs $M^2$ like those before described, but I have added a ring R arranged within the springs below the plunger head and normally bearing at its periphery against the upper portions of the springs. This spring is suspended from the plunger head by set screws $r$ which are threaded and engage threaded openings $r'$ in the head $d^a$. By these devices the ring R may be raised and lowered and may thus alter the tension of the springs and thus vary their pressure and friction on the walls of the chamber C.

By the use of segmental springs held securely at one end and bearing at their free ends on tapered surfaces a most flexible and efficient cushion for the absorption of shocks and vibrations is afforded.

I claim as my invention:

1. A yielding connection for vehicles, comprising a casing having a tapered chamber and a plunger provided with spring arms inclined downwardly and inwardly, fitting the walls of the chamber and pressing outwardly against them.

2. A spring device for vehicles, comprising a casing having a tapered chamber and a plunger operating in said chamber having a head and provided with a series of segmental spring arms having upper horizontal portions attached to the head and other portions extending downwardly and inwardly therefrom and pressing yieldingly against the walls of the chamber to thus produce friction and spring tension as thereon.

3. The combination of a casing having a tapered chamber, a buffer in said chamber, a plunger operating in said chamber having a series of segmental springs extending downwardly and inwardly from the plunger and pressing yieldingly outward against the walls of the tapered chamber.

4. The combination of a casing having a tapered chamber and a plunger operating in said chamber, comprising a head, a series of segmental springs extending downwardly from the head and pressing yieldingly against the tapered walls of the chamber, a ring inclosed by springs and bearing against them, and devices for raising and lowering the ring to adjust the tension of the springs.

In testimony whereof, I have hereunto subscribed my name.

JOHN L. DOUGAN.

Witnesses:
W. H. LARIMER,
C. E. GEORGE,
E. F. FURGZON.